(12) United States Patent
Cutler et al.

(10) Patent No.: US 6,303,368 B1
(45) Date of Patent: Oct. 16, 2001

(54) DEVICE FOR LIQUID OR GAS PROCESS STREAMS AND METHOD OF MAKING AND USING SAME

(75) Inventors: Willard A. Cutler; Tinghong Tao, both of Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/413,716

(22) Filed: Oct. 5, 1999

Related U.S. Application Data

(60) Provisional application No. 60/103,345, filed on Oct. 7, 1998.

(51) Int. Cl.[7] .................................................. C12M 1/12
(52) U.S. Cl. ............................. 435/297.1; 435/289.1; 435/299.1; 502/7; 502/60; 502/63; 502/65; 502/66; 502/68; 502/73; 502/74; 502/439; 210/616; 210/617
(58) Field of Search .................................. 502/7, 64, 60, 502/439, 63, 65, 66, 68, 73, 74; 210/616, 617; 435/283.1, 289.1, 299.1, 297.1

(56) References Cited

U.S. PATENT DOCUMENTS

| | | |
|---|---|---|
| 3,885,977 | 5/1975 | Lachman et al. .................... 106/62 |
| 4,127,691 | 11/1978 | Frost ................................... 428/116 |
| 4,758,272 | 7/1988 | Pierotti et al. ........................ 75/246 |
| 4,992,233 | 2/1991 | Swaroop et al. ........................ 419/2 |
| 5,427,601 | 6/1995 | Harada et al. ........................ 75/235 |
| 5,451,444 | 9/1995 | DeLiso et al. ...................... 428/116 |
| 5,569,634 | * 10/1996 | Miller et al. ........................... 502/64 |
| 5,716,899 | * 2/1998 | Guile et al. ........................... 502/439 |
| 5,750,026 | * 5/1998 | Gadkaree et al. ................ 210/502.1 |

\* cited by examiner

Primary Examiner—David A. Redding
(74) Attorney, Agent, or Firm—L. Rita Herzfeld; Anca C. Gheorghiu

(57) ABSTRACT

A device for use in processing of a liquid and/or gas stream. The device is made up of a monolithic structure having active powder for treating streams. The structure has an inlet end and an outlet end and a multiplicity of cells extending from inlet end to outlet end. The cells are separated from one another by porous walls, a portion of the total number of cells being plugged in a pattern such that a stream enters the device through the unplugged cells at the inlet end and passes through at least two porous walls and the active powder in-between, and thereafter passes out of the device through unplugged cells at the outlet end. The device finds use in a number of applications including ion exchange, adsorption, biological and chemical reactions, and catalytic applications.

14 Claims, 6 Drawing Sheets

DEVICE FOR LIQUID OR GAS PROCESS STREAMS AND METHOD OF MAKING AND USING SAME

This application claims the benefit of U.S. Provisional Application No. 60/103,345, filed Oct. 7, 1998, entitled "Device for Liquid or Gas Process Streams and Method of Making and Using Same", by W. Cutler, et al.

This invention relates to a device for processing liquid or gas streams for ion exchange, catalysis, adsorption, chemical or biological reactions, purification or separation. In particular, it relates to a monolithic article containing one or more powder or granular agents.

BACKGROUND OF THE INVENTION

Packed beds of "active" powders or granules are commonly used to treat liquid or gas streams using gravity or pressurized flow. These loose materials are used in packed beds, which commonly experience large pressure drops, especially in the case where the bed particle size is small. However, small particle sizes are desirable in that they increase process performance by improving material utilization effectiveness and packing density.

In many processes packed bed columns of considerable length are sometimes required. However, with increasing column length, the flow rate decreases. Also, such columns develop channeling of the feed solution, which decreases process efficiency. Packed beds also have issues with material attrition (losing small particles).

A wide variety of active granule or powder materials are used in industrial applications, some of which include: ion exchange materials (zeolites, organic resins, gamma alumina, etc); adsorption materials (carbon, zeolites, clays, etc); purification materials (iodinated resins, Ag-impregnated materials, etc.); chemical and biological reaction materials (enzymes, proteins, carbon, biochemical materials, etc.); and catalyst materials (unsupported or supported platinum group metals and compounds, transition metals and compounds, alkali metals and compounds, alkaline earth compounds, rare earth compounds etc).

Accordingly, a need exists for efficient devices in which the disadvantages of loose powder or granular or loosely bound materials are eliminated and in which the disadvantages of decreased flow large packed beds and decreased efficiency due to channeling are eliminated.

The present invention provides such a device and method.

SUMMARY OF THE INVENTION

In accordance with one aspect of the invention, there is provided a device for use in processing of a liquid and/or gas stream. The device is made up of a monolithic structure having active powder for treating streams. The structure has an inlet end and an outlet end and a multiplicity of cells extending from inlet end to outlet end. The cells are separated from one another by porous walls, a portion of the total number of cells being plugged in a pattern such that a stream enters the device through the unplugged cells at the inlet end and passes through at least two porous walls and the active powder in-between, and thereafter passes out of the device through unplugged cells at the outlet end. The device finds use in a number of applications including ion exchange, adsorption, biological and chemical reactions, and catalytic applications.

BRIEF DESCRIPTION OF THE DRAWINGS

FIGS. 1A–4A show the respective flow paths of a stream passing through the device.

DETAILED DESCRIPTION OF THE INVENTION

Figure 1:
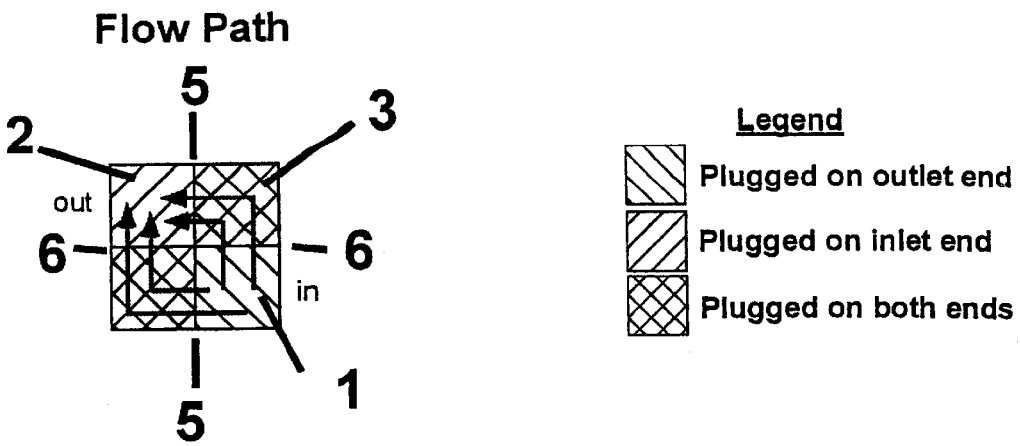
FIGS. 1–4 show various plugging patterns that can be used in the device of the present invention.
Figure 1:
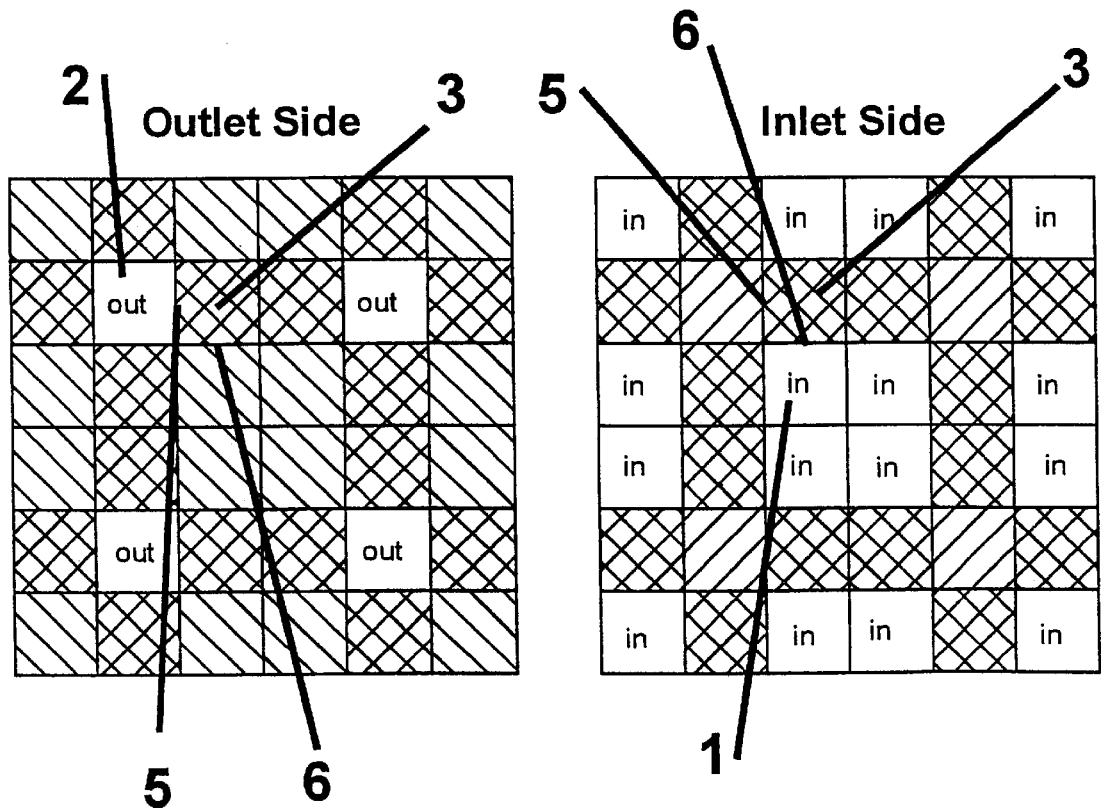

This invention relates to a device in the form of a cellular monolith having an inlet end and an outlet end, the cells running the length of the device from inlet end to outlet end. The cells have porous walls through which a liquid or gas stream can pass. A distinctive characteristic of the device of this invention is that the cells are selectively plugged at the inlet and outlet ends in patterns that allow for flow of the liquid stream through at least two consecutive cell walls. This device can be used for either gravity flow or pressurized flow. Active powder is sealed by the plugging pattern between two consecutive cell walls. This invention results in several positive attributes: First, any powder or granule for any use can be incorporated into the honeycomb. Second, the flow patterns created by this invention forces fluid flow across the cells packed with active powder (thin packed bed=low flow resistance) instead of down the length of the cells packed with active powder (thick packed bed=high flow resistance). Third, the powder is confined in the honeycomb regardless of orientation, which means that expensive reclamation processes are not needed and attrition is low. Forth, fluid streams experience increased contact efficiency between the active powder and the fluid stream, thereby increasing process efficiency. Fifth, relatively small particle sizes and amounts are used per unit volume to efficiently run the process.

The device is suitable for purification methods for water, such as ion exchange, or physical filtration. Although not limited to these uses, the device is especially suited for purification of water having bacteria or other parasites, chlorine, Cu, Zn, heavy metals such as lead, and for water softening, and removal of other ions. It is also suited for particulate and cyst removal. The device is useful for treating other liquid and gas streams.

The honeycomb geometry, (characterized by a large number of cells per unit area) is especially advantageous for high flows with small filter sizes due to the high surface area packed into a small volume.

Generally honeycomb cell densities range from 235 cells/$cm^2$ (about 1500 cells/$in^2$) to 1.5 cells/$cm^2$ (about 10 cells/$in^2$). Some examples of commonly used honeycombs in addition to these, although it is to be understood that the invention is not limited to such, are about 94 cells/cm$^2$ (about 600 cells/in$^2$), about 62 cells/cm$^2$ (about 400 cells/in$^2$), or about 47 cells/cm$^2$ (about 300 cells/in$^2$), and those having about 31 cells/cm$^2$ (about 200 cells/in$^2$). Typical wall thickness' are for example, about 0.15 mm (about 6 mils) for about 62 cells/cm$^2$ (about 400 cells/in$^2$) honeycombs. Wall (web) thickness' range typically from about 0.1 to about 1.2 mm (about 4 to about 50 mils).

This invention is especially advantageous for honeycombs having ~20–70% wall porosity. Wall pore sizes can range from 0.1 to 2500 $\mu$m and more typically about 0.1 to 100 $\mu$m, depending on the application. The pore size must be at smaller than the powder size. Typically the powder size is about 0.25 to 3000 $\mu$m in diameter. The pore size for removing parasites from water should be <3 $\mu$m in diameter.

The cells of the multicellular device are selectively plugged to allow maximum contact of their walls with the liquid stream for maximum purification efficiency. Plugging can be done by techniques known in the art using compatible plugging materials that will seal off the cell. For example, with ceramic materials used in low temperature applications, a two-part epoxy or other suitable sealant/adhesive is suitable. The honeycomb is typically plugged on one side, then the free flowing "active" powder is then poured into the honeycomb while the honeycomb is vibrated (shaker table) allowing the powder to completely fill and pack in the cells. The honeycomb is then plugged on the opposite side, returned to its original orientation and again vibrated to remove the excess powder.

Some examples of advantageous plugging patterns and flow paths are shown in the Figures. It is to be understood that the Figures are illustrative and not limited to the plugging patterns shown, as any pattern that accomplishes flow from inlet end to outlet end through at least two walls is within the scope of this invention. The stream enters the open cells at the inlet end and exits the open cells at the outlet end. Hatched regions show plugged positions.

Figure 2A:
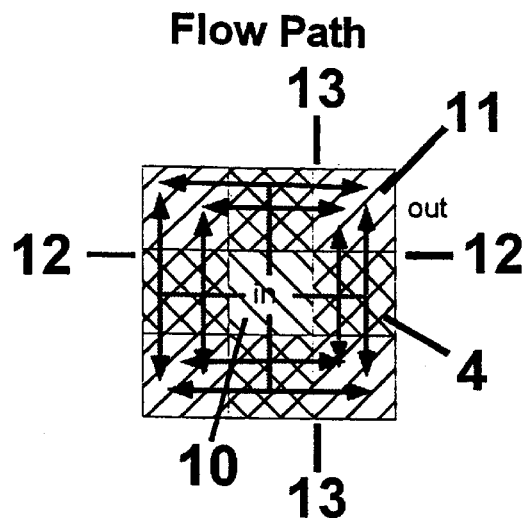
Figure 2:
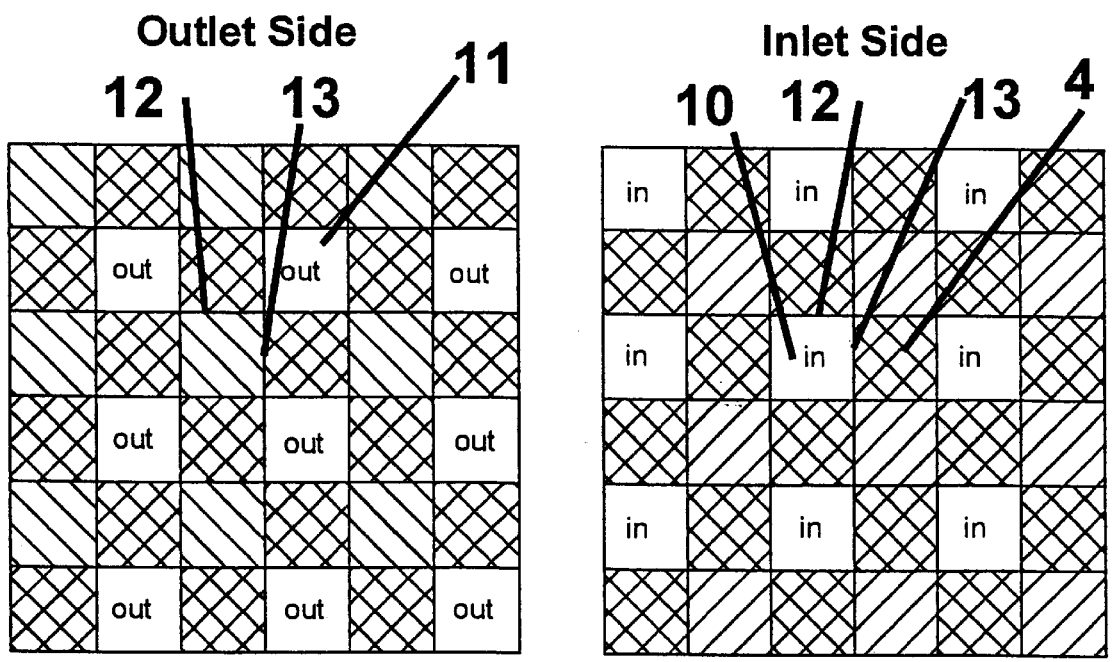
Figure 3A:
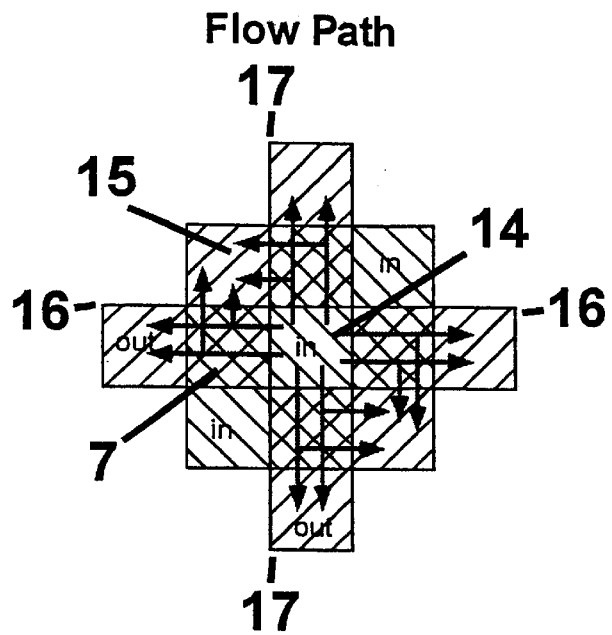
Figure 3:
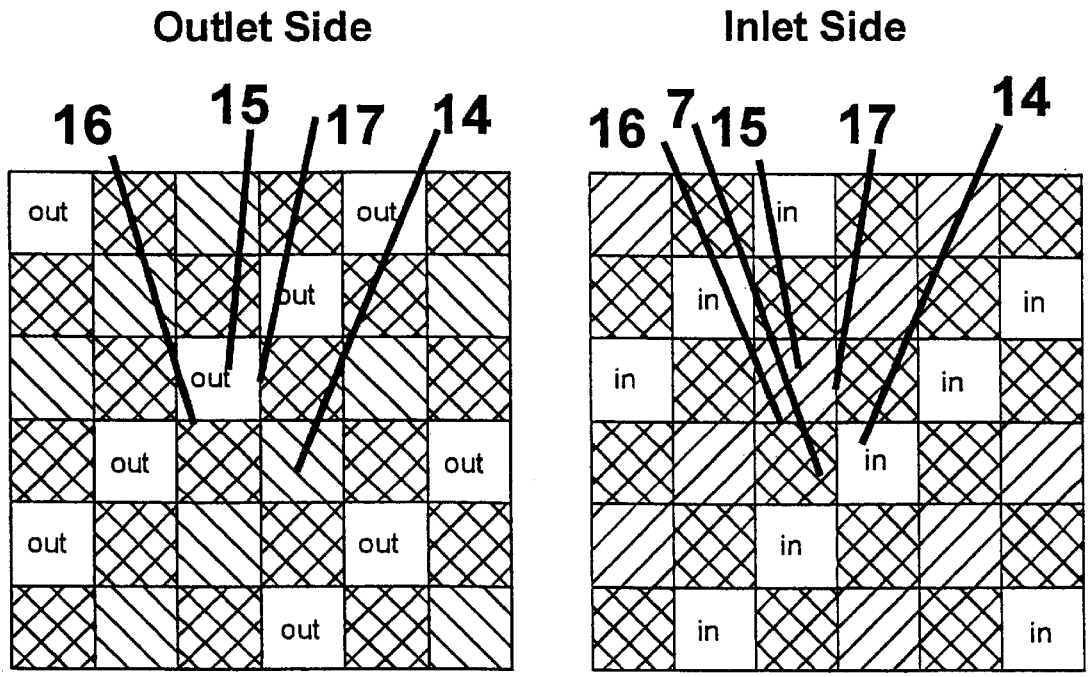
Figure 4A:
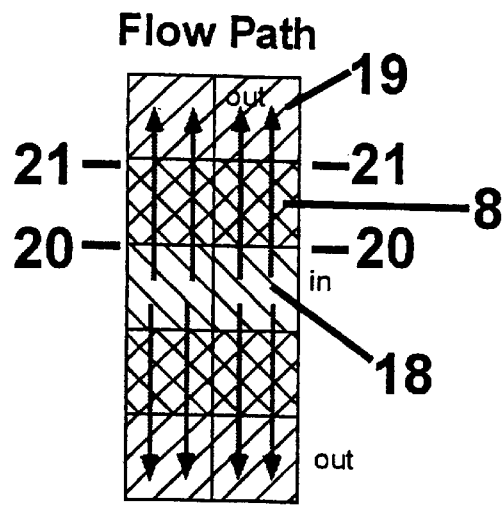
Figure 4:
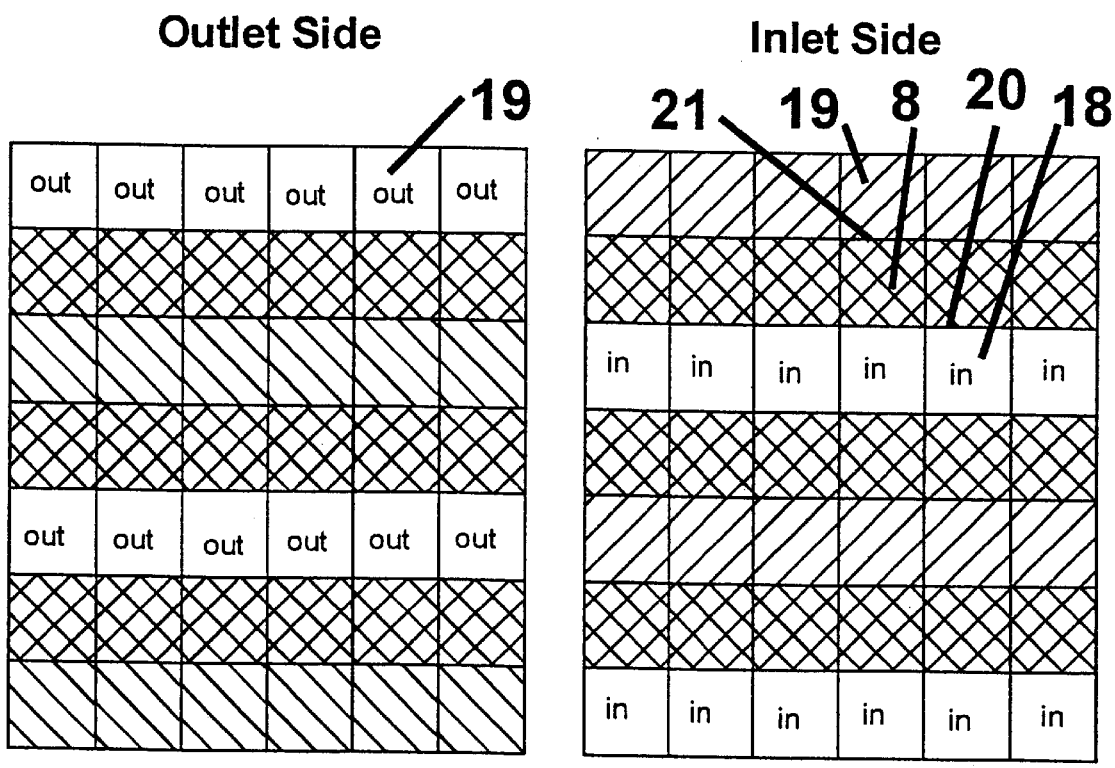

FIG. 1 depicts plugging pattern A, and FIG. 1A shows the flow paths taken by a fluid stream as it passes through the cells. For example, the fluid stream that enters at the inlet end of the cell labeled 1, can flow through cell walls 5 and 6 to exit cell 2 at its outlet end. The cell labeled 3 is filled with active material and plugged on both ends. The flow is forced to pass through cell 3 to reach the outlet FIG. 2 shows plugging pattern B, and FIG. 2A shows the flow paths. A fluid stream that enters at the inlet end of cell 10, can flow through cell walls 12 and 13 to exit cell 11 at the outlet end. The cell labeled 4 is filled with active material and plugged on both ends. The flow is forced to pass through cell 4 to reach the outlet FIG. 3 depicts plugging pattern C, and FIG. 3A shows the flow paths taken by a fluid stream as it passes through the cells. For example, the liquid stream that enters at opening 14 at the inlet end can flow through cell walls 16 and 17 to exit at opening 15 at the outlet end. The cell labeled 7 is filled with active material and plugged on both ends. The flow is forced to pass through cell 7 to reach the outlet FIG. 4 depicts plugging pattern D, and FIG. 4A shows the flow paths taken by a fluid stream as it passes through the cells. For example, the fluid stream that enters at opening 18 at the inlet end, can flow through cell walls 20 and 21 to exit at opening 19 at the outlet end. The cell labeled 8 is filled with active material and plugged on both ends. The flow is forced to pass through cell 8 to reach the outlet.

Cells of the substrate can be filled with the active materials. This is done typically in the patterns discussed above, where those cells which are plugged on both ends are filled with the purifying agent. With the plugging patterns described above, flow through the packed bed is across the cell and not down the cell, and thus should not create a large pressure drop within the cell itself. While this design requires the flow to go through two consecutive walls, which will result in reduced flow, the advantages in powder retention and increased particulate (inorganic or organic) removal filtration efficiency will be substantial. Commercially available active materials can be used in their current state without additional processing.

A wide range of materials can be selected for use in conjunction with honeycombs, depending on the process involved. These materials and application can include but are not limited to: (I) Ion exchange materials (zeolites, gamma alumina, clays, zirconia, sulfonated zirconia, heteropoly acids, e.g. heteropoly molybdic acid, amorphous titanium silicates, organic resins, amorphous acidic gels, etc.) for heavy metal removal, nitrate removal, sulfide removal, herbicide and insecticide removal, water softening or other unwanted ion removal applications. (II) Adsorption materials (activated carbon, zeolites, clays, etc) for use in removing chlorine, chloramines, organic chemicals, solvents, radon, radionuclides or other unwanted species from streams, and adsorption materials, (alkali, alkaline earth, rare earth, and/or base metal oxides) for $NO_x$ adsorption. (III) Purification materials (iodine, iodides, silver, copper, zinc, iodinated resins, Ag-impregnated materials, etc.), to remove biological contaminants such as viruses and bacteria. (IV) Chemical and biological reactions (enzymes, proteins, activated carbon, biochemical, bioactive materials, chemically active materials etc.) for removing VOCs, arsenic and other pollutants, or for creating useful chemical, pharmaceutical, petrochemical, food processing, industrial, reaction products. (V) Catalyst materials such as for example, materials or compounds of: unsupported or supported platinum group metal, transition metal, alkali metal, alkaline earth metal, rare earth metal, etc., for use in chemical processes, pollution control and other processes.

Suitable substrate materials include porous ceramic, polymers, glass ceramics, glass, metal, graphitic carbon, activated carbon (activated carbon powder or particles or in-situ active carbon), and combinations thereof. By combinations is meant physical or chemical combinations, eg., mixtures, compounds, or composites. The substrate will be selected for a particular application based on the temperature, pressure and physical and chemical durability requirements of the application.

Some materials that are especially suited to the practice of the present invention due to their porosity characteristics and durability, although it is to be understood that the invention is not limited to such, are those made of cordierite, mullite, clay, magnesia, and metal oxides, talc, zircon, zirconia, zirconates, zirconia-spinel, magnesium alumino-silicates, spinel, alumina, silica, silicates, borides, alumino-silicates, eg., porcelains, lithium aluminosilicates, alumina silica, feldspar, titania, fused silica, nitrides, borides, carbides, eg., silicon carbide, silicon nitride or mixtures of these. Cordierite or mullite is preferred for some applications due to its thermal expansion and porosity. Some typical ceramic substrates are disclosed in U.S. Pat. Nos. 4,127,691 and 3,885,977. Those patents are herein incorporated by reference as filed.

Suitable metallic materials are any metal or alloy or intermetallic compound that provides durable structural service.

Particularly useful are alloys, which are predominantly of iron group metal (i.e. Fe, Ni, and Co), either with carbon (e.g. steels, especially stainless or high temperature steels) or without carbon. Most typical of the latter alloys for higher temperature service are those consisting essentially of iron group metal and aluminum, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders for forming substrates are disclosed in U.S. Pat. Nos. 4,992,233, 4,758,272, and 5,427,601 which are herein incorporated by reference as filed.

Figure 5:
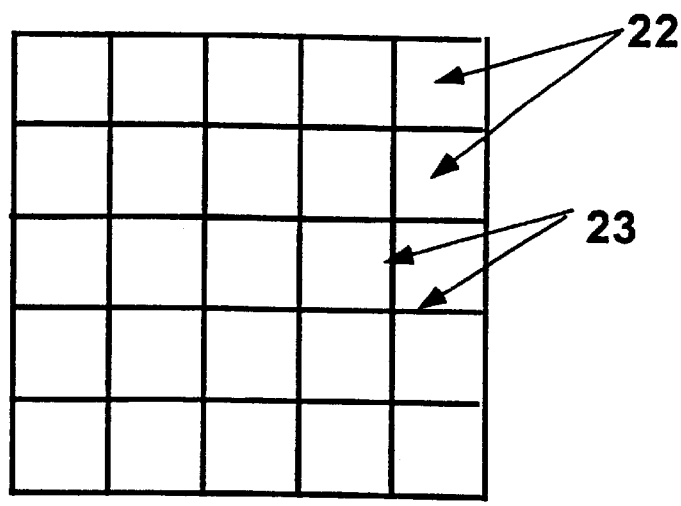
FIG. 5 is a schematic diagram of a frontal view of a honeycomb having all cells identical in size and shape, and wall thickness.

Honeycombs commonly have symmetric cells that is, all cells are uniform and nearly identical. FIG. 5 is a schematic diagram of a frontal view of a honeycomb having all cells, 22, identical in size and shape, and wall thickness as shown by 23.

Figure 6:
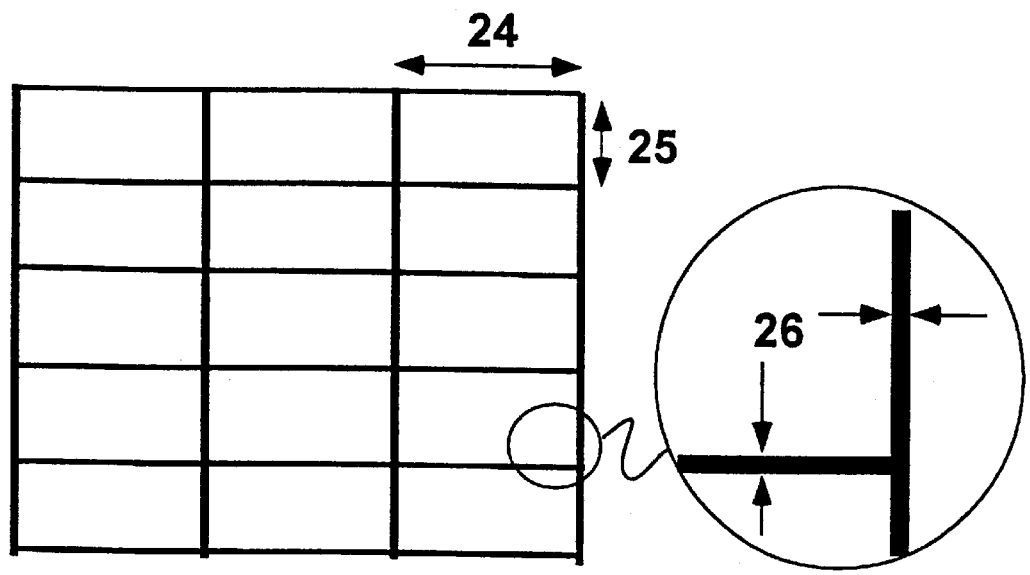
FIG. 6 is a schematic diagram of a frontal view of a honeycomb where the in-plane distance between cell walls in one direction is uniform, but greater than the distance between cell walls in the other direction, and where all wall thicknesses are uniform.

Other honeycomb designs, however, can be used to practice this invention and may be preferred for many flow applications. Such honeycombs can have engineered cells, cells which are designed for the specific application. This means that the inlet and outlet cells do not have to be identical in dimensions to each other (cell length ≠ cell width), or to the filled cells. This means that cell dimensions can be optimized to achieve a specific bed thickness, while maximizing volume utilization. Certain engineered cells allow the width of the cell (and thus the width of the packed bed which is sealed in the honeycomb) and the length of the cells to be varied independently for the application. For example, FIG. 6 is a schematic diagram of a frontal view of a honeycomb where the in-plane distance between cell walls in one direction is uniform as shown by 24, but greater than the distance between cell walls in the other direction, as shown by 25, and where all wall thicknesses, 26, are uniform.

Figure 7:
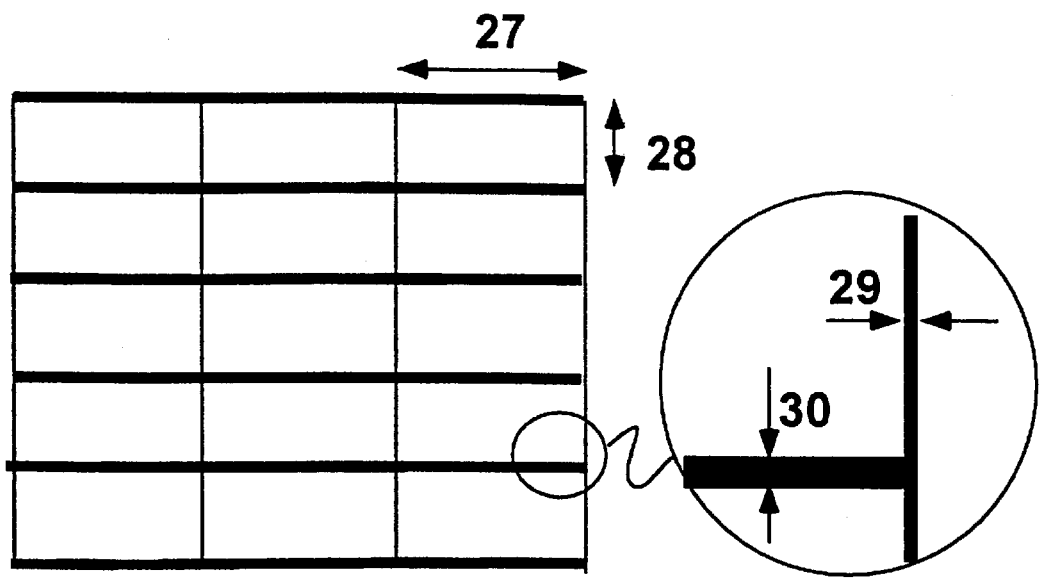
FIG. 7, is a schematic diagram of a frontal view of a honeycomb where the in-plane distance between cell walls in one direction is uniform, but greater than the distance between cell walls in the other direction, but the wall thickness in one direction is different than the measured thickness in the other direction.

In another inventive honeycomb, as shown in FIG. 7, the in-plane distance, 27, between cell walls in one direction is uniform, but greater than the distance, 28, between cell walls in the other direction, but the wall thickness in one direction, 29, is different than the measured thickness, 30, in the other direction.

Figure 8:
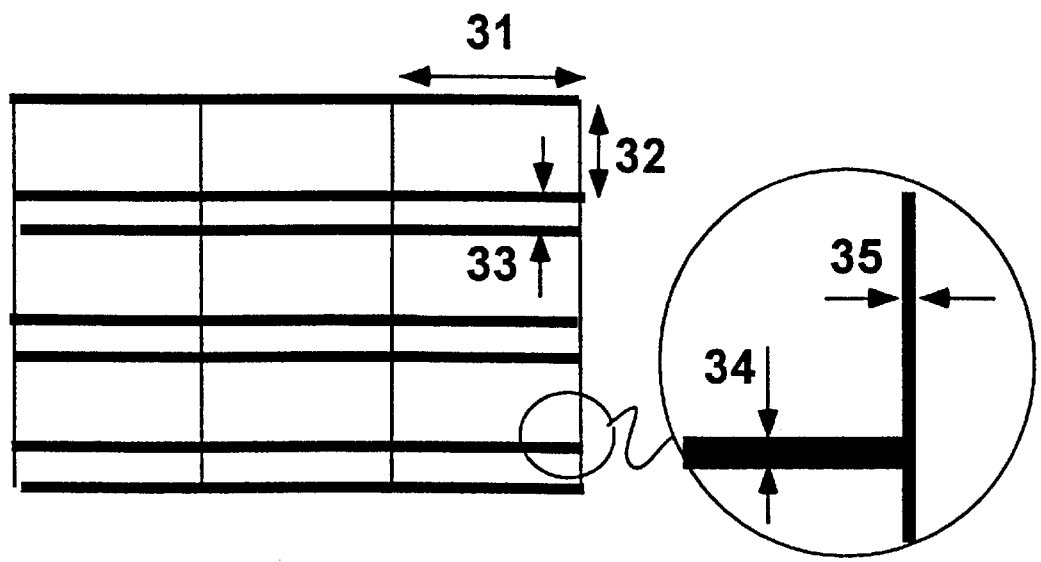
FIG. 8 is a schematic diagram of a frontal view of a honeycomb where the in-plane distance between cell walls in one direction is uniform, but greater than the distance between cell walls in the other direction. In the other direction, the distance between the walls can vary, e.g. periodically (wide-narrow-wide-narrow).

In another inventive honeycomb as shown in FIG. 8, the in-plane distance between cell walls in one direction, 31, is uniform, but greater than the distance between cell walls in the other direction. (The third direction is axial direction.) In the other direction, the distance between the walls can vary, e.g. periodically (wide-narrow-wide-narrow, etc.) as shown by distances 32, and 33. The wall thickness, 34 and 35, in the non-axial directions can be any thickness.

This use of engineered cells also allows one to create a difference in cell size between the inlet and outlet cells or channels and the cells containing the active powder. Engineered cells allow for more surface area to be available for flow when used with some plugging patterns such as that seen in FIG. 4. Also, the thickness of the walls within the honeycomb can all be uniform, or can be varied depending on the desired flow path and cell wall location within the honeycomb. The cells can be parallel or can be offset with respect to one another, and can be any geometry such as hexagons, triangles, etc.

Honeycombs regardless of their cell size, geometry or structure can also be washcoated with a catalyst or other material before their use in the present invention. Also they can be coated with a carbon precursor which is thereafter cured, carbonized, and activated to form a continuous uninterrupted coating of activated carbon on the honeycomb, as described in U.S. Pat. No. 5,451,444, which is herein incorporated by reference as filed.

To more fully illustrate the invention, the following non-limiting examples are presented. All parts, portions, and percentages are on a weight basis unless otherwise stated.

EXAMPLE 1

Filled Ion Exchange Cells in Plugged Honeycombs

Cells of 62 and 31 cell/cm$^2$, 0.3 mm wall honeycombs were selectively filled with active material, which was either amorphous titanium silicate (ATS) or a combination of ATS and activated carbon, in patterns shown in FIGS. 1, 2, 3 and 4 as follows. A two-part epoxy was used to plug one side of the honeycomb according to the patterns identified earlier. The plugged honeycombs were placed with the plugged side down on a vibrating table. The active powder was poured into the open honeycomb cells (unplugged side). The vibration allowed the powder to flow freely and pack efficiently into the cells. The open side of the honeycomb was then plugged with the opposite, but appropriate pattern. The honeycomb was then oriented on the vibrating table so that the original plugged side was up, allowing any excess powder to flow from the open cells. These plugging patterns require the flow to pass through some cells that are plugged on both ends. This plugging pattern also creates more efficient particulate or cyst filtration. These flow patterns are designed to move the stream perpendicular to the cell axis (across the cell) simulating a thin packed bed. This prevents low flow restrictions imposed on sending the flow parallel to the cell axis (down the length of the cell) which simulates a thick packed bed. These patterns give excellent lead removal properties, about 80–100% removal and the capacity of the filter was not reached. Furthermore, very little active material is required to remove lead from water. Efficiencies remained in the 80–100% range even when the active material was diluted with inert filler to reduce the amount of active material in the honeycomb from about 5 g/in$^3$ of honeycomb (in the above samples) to about 0.4 g/in$^3$.

EXAMPLE 2

Plugging Patterns and Their Effect on Cyst Filtration

Plugging patterns, which cause flow through two walls, have several advantages over single wall flow. First, for compositions which may not provide ≧99.95% cyst filtration efficiency going through a single wall, an additional pass through a wall can provide this efficiency. Second, for compositions that meet cyst filtration efficiency (99.95%), an additional pass through a wall can provide a margin of safety, which may prevent the need for extensive quality control testing. Third, some applications may require higher efficiencies than current cyst standards. In this case, an additional pass through a wall can provide improved efficiency above and beyond those available with single wall flow units. The results for several honeycombs, (activated carbon coated cordierite, and mullite) show excellent cyst filtration efficiencies of >99.96%, as compared with the NSF, Std. 53 efficiency goal of >99.95%. However, some flow rate sacrifice is required.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A device for use in processing of a liquid and/or gas stream, the device comprising a monolithic structure having active powder for treating streams, the structure having an inlet end and an outlet end and a multiplicity of cells extending from inlet end to outlet end, the cells being separated from one another by porous walls, a portion of the total number of cells being filled with an active material and plugged at the inlet and the outlet ends, a portion of the remaining cells being plugged at the inlet end, and the cells that are open at the inlet end being plugged at the outlet end, so that a stream entering the device through the unplugged cells at the inlet end passes through two consecutive porous walls forming a cell with active powder, and thereafter passes out of the device through unplugged cells at the outlet end.

2. A device of claim 1 wherein the device is a honeycomb having a washcoat.

3. A device of claim 1 wherein the device is a honeycomb having uniform and identical size cell openings and wall thicknesses.

4. A device of claim 1 wherein the device is a honeycomb wherein the in-plane distance between cell walls in one direction is uniform, but greater than the distance between cell walls in the other direction which is non-axial, and wherein all cell wall thicknesses are uniform.

5. A device of claim 1 wherein the device is a honeycomb wherein the in-plane distance between cell walls in one direction is uniform, but greater than the distance between cell walls in the other direction which is non-axial, and wherein the cell wall thicknesses in one direction are unequal to the cell wall thicknesses in the other direction.

6. A device of claim 1 wherein the device is a honeycomb wherein the in-plane distance between cell walls in one direction is uniform, but greater than the distance between cell walls in the other direction which is non-axial, and the distance between the cell walls in said other direction is bi-modal and periodic.

7. A device of claim 1 wherein the device is a honeycomb with an average wall pore size of about 0.1 to 2500 micrometers in diameter.

8. A device of claim 1 wherein the active powders have an average particle diameter of about 0.25 to 3000 micrometers.

9. A device of claim 1 wherein the average wall pore diameter is less than the average particle diameter of the active powder.

10. A device of claim 1 wherein the active powder material is selected from the group consisting of ion exchange materials, adsorption materials, chemically active materials, biologically active materials, catalyst materials, and combinations thereof.

11. A device of claim 10 wherein the active material is selected from the group consisting of proteins, platinum group metal, transition metal, alkali metal, alkaline earth metal, rare earth metal, zeolites, gamma alumina, clays, heteropoly acids, organic ion exchange resins, and combinations thereof.

12. A device of claim 10 wherein the active material is selected from the group consisting of activated carbon, amorphous acidic gels, iodine, iodides, silver, copper, zirconia, sulfonated zirconia, zinc, amorphous titanium silicates, enzymes, and combinations thereof.

13. A device of claim 1 wherein the device contains active material for purifying fluid streams of contaminants selected from the group consisting of bacteria, parasites, chemicals, heavy metals, ions, and combinations thereof.

14. A device of claim 1 wherein the device contains active material for carrying out chemical reactions in fluid streams containing-reactants selected from the group consisting of industrial chemicals, petrochemicals, pharmaceuticals, food processing, and fine chemicals.

* * * * *